US008087386B2

(12) United States Patent
Purswell et al.

(10) Patent No.: US 8,087,386 B2
(45) Date of Patent: Jan. 3, 2012

(54) AUTOMATED VACCINATION METHOD AND SYSTEM

(75) Inventors: Joseph L. Purswell, Starkville, MS (US); Scott L. Branton, Starkville, MS (US); Edward F. Todd, West Point, MS (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 84 days.

(21) Appl. No.: 12/718,750

(22) Filed: Mar. 5, 2010

(65) Prior Publication Data

US 2011/0217322 A1 Sep. 8, 2011

(51) Int. Cl.
*A61D 11/00* (2006.01)
*A01K 13/00* (2006.01)

(52) U.S. Cl. ........................ 119/651; 119/72.5; 119/665

(58) Field of Classification Search .................. 119/651, 119/656, 657, 665–667, 669, 670, 72, 72.5, 119/51.02
See application file for complete search history.

(56) References Cited

U.S. PATENT DOCUMENTS

| | | | | | |
|---|---|---|---|---|---|
| 883,132 | A | * | 3/1908 | Goff | 119/669 |
| 1,505,641 | A | * | 8/1924 | Hendrickson | 119/667 |
| 3,032,011 | A | * | 5/1962 | Stramel | 119/613 |
| 3,173,402 | A | * | 3/1965 | Cassel | 119/667 |
| 3,724,425 | A | * | 4/1973 | Thompson | 119/72 |
| 3,870,023 | A | * | 3/1975 | Wilson | 119/666 |
| 4,316,464 | A | | 2/1982 | Peterson | |
| 4,449,968 | A | * | 5/1984 | Peterson | 604/24 |
| 4,470,374 | A | * | 9/1984 | Upperman | 119/72 |
| 4,580,529 | A | * | 4/1986 | Wilson | 119/651 |
| 4,863,443 | A | | 9/1989 | Hornung | |
| 5,025,754 | A | * | 6/1991 | Plyler | 119/73 |
| 5,056,467 | A | * | 10/1991 | Schaefer | 119/666 |
| 5,312,353 | A | | 5/1994 | Boggess et al. | |
| 5,630,379 | A | * | 5/1997 | Gerk et al. | 119/667 |
| 2008/0190373 | A1 | * | 8/2008 | Lee | 119/72 |

* cited by examiner

*Primary Examiner* — Rob Swiatek
*Assistant Examiner* — Ebony Evans
(74) *Attorney, Agent, or Firm* — John D. Fado; Robert D. Jones

(57) ABSTRACT

The automated vaccination system enables an operator to effectively vaccinate large numbers of poultry by motivating the poultry to congregate, and then spraying a vaccination solution in the area of the congregated poultry. In the preferred embodiment, drinking water is withheld from the poultry. The drinking water is then restored so that the poultry congregate around the drinking line. As the poultry gather around the drinking line, a spray bar sprays vaccination solution around the poultry so that the poultry inhale the vaccination solution and are successfully vaccinated.

19 Claims, 4 Drawing Sheets

| | $R^2$ | $\tau$ | $2\tau$ |
|---|---|---|---|
| Day 1 | 0.896 | 11.7 | 23.5 |
| Day 2 | 0.683 | 6.8 | 13.5 |
| Day 3 | 0.899 | 8.0 | 16.0 |
| Day 4 | 0.906 | 10.7 | 21.5 |

| | |
|---|---|
| Mean | 18.6 |
| S.D. | 4.6 |

Figure 2

AUTOMATED VACCINATION METHOD AND SYSTEM

FIELD OF THE INVENTION

The present invention relates to a system and method for vaccinating animals. Specifically, the current invention comprises an automated system and method for vaccinating poultry.

BACKGROUND OF THE INVENTION

Modern integrated poultry operations are expansive, with the total industry producing an estimated 9.1 billion broilers in 2007. In modern broiler production operations, up to 25,000 birds are housed in one facility and vaccinating this large number of birds is a time consuming and labor intensive process. Currently vaccines are commonly administered through a manual blower-spray process or the vaccines are mixed into drinking water and then made available to the poultry.

In accordance with the manual blower-spray vaccination process, a liquid form of the vaccine is directed into a conventional "leaf blower"-type portable mechanism so that the vaccine is entrained in the blower discharge air. As an operator moves about in a poultry pen, the operator directs the blower (with entrained vaccine) towards the poultry and attempts to ensure that all of the birds are exposed to the vaccine.

However, the manual blower-spray process results in inconsistent and essentially random application of the sprayed vaccine. Further, the process is time consuming and unpleasant for the spray operator and the poultry. The blower causes dust and feces to be at least temporarily suspended in the air and the noise disturbs and stresses the poultry.

In accordance with the drinking water vaccine administration process, water is withheld from the poultry for a short time, and then when the drinking water is restored, the water contains the vaccine. However, many of the vaccines do not readily lend themselves to uniformly dissolving in large quantities water and the dilution of the vaccine means that greater quantities are required to vaccinate a selected number of birds. Further, the nipples in the drinking lines are commonly worn, leaky, and somewhat inefficient so that significant quantities of the solution simply drip onto the pen floor.

There are also biological concerns associated with the drinking water vaccine administration process. Orally applied vaccines are absorbed through the stomach lining and may become mixed with other stomach contents. Consequently, orally applied vaccines are generally less reliable and require the ingestion of greater quantities of the vaccine to ensure successful vaccination.

An improved method and system of vaccinating poultry would facilitate faster vaccination, reduce labor costs, improve bird health through uniform application, and reduce production losses. The current invention comprises an automated spray-type vaccine system that allows the vaccine to be absorbed but does not significantly disturb the birds or require an operator to physically enter the poultry pen during the vaccination process.

SUMMARY OF THE INVENTION

The current invention is directed to a poultry vaccination system. The vaccination system comprises a vaccine spray means positioned adjacent to a sustenance supply means. In the preferred embodiment, the sustenance comprises water.

In operation, the supply of water is temporarily withheld and then restored. As the poultry gather around the water line, the vaccine spray means sprays the area so that the poultry inhale vaccine spray solution and are successfully vaccinated.

BRIEF DESCRIPTION OF THE DRAWINGS

FIG. 2 is a table showing the results of non-linear regression analyses to determine 90% time constants (2τ).

DETAILED DESCRIPTION OF PREFERRED EMBODIMENTS

Figure 1:
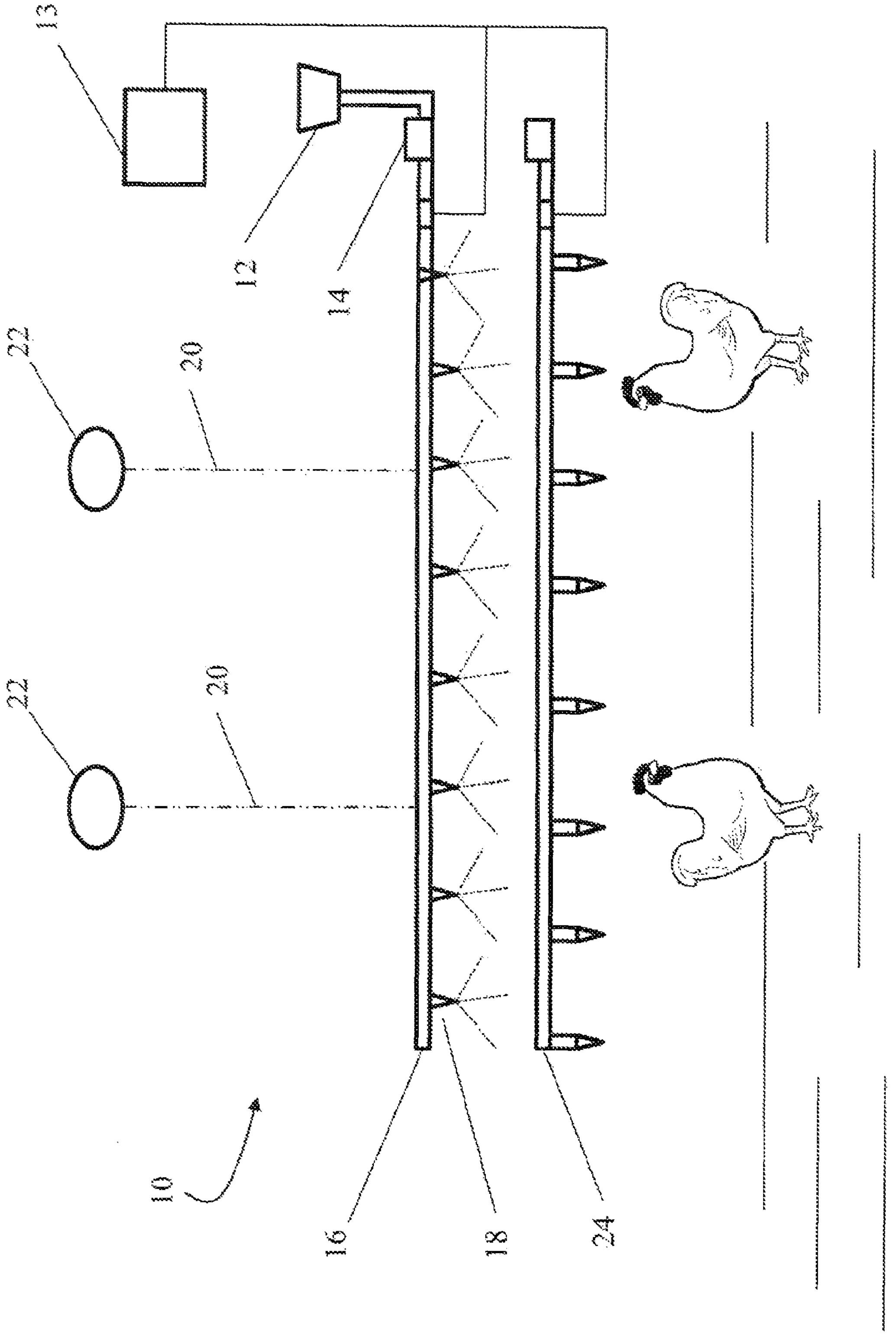
FIG. 1 is a schematic of the current invention.

The present invention comprises an automated vaccination system 10 generally shown in FIG. 1.

In the preferred embodiment, the system 10 comprises a vaccine mixing means 12 and a pressurizing pump 14. The specific form of the vaccine mixing means 12 is contingent on the type of vaccine used and the recommendations of the vaccine manufacturer. Based on the inventor's experimental results, a large reservoir for pre-mixing of the vaccine solution may be impractical given the volume of water required to treat the entire flock. An in-line mixing system which meters a vaccine into a flowing carrier fluid (such as water) may be may be the most practical. In its most basic form, the vaccine mixing means 12 may simply be a drip bottle or a similar mechanism for metering a prepared liquid vaccine into a vaccinating spray solution.

In the preferred embodiment, the pressurizing pump 14 pumps the vaccinating solution into a distribution portion of the system 10. In alternative embodiments the pump 14 may be unnecessary because the vaccinating solution may be pressurized by other means, such as gravity (i.e. hydrostatic pressure), systemic utility water pressure, or the like.

The pump 14 is connected to a tubular spray bar 16 which transports the vaccinating solution into the poultry pen for distribution. The dimensions of the spray bar 16 are based on the needs of an operator or the nature of a particular vaccine. A plurality of nozzles 18 are positioned along the length of the spray bar 16 and project outwardly from the spray bar 16. (Note that for the sake of simplicity, only one of the nozzles 18 are labeled in FIG. 1.) In the preferred embodiment, the nozzles 18 are approximately three feet apart and create a fine misting spray that settles downwardly toward the floor of the poultry pen. In alternative embodiments, the spray bar 16 may simply have a series of apertures formed so that when the spray bar 16 is pressurized, the vaccine solution to sprays directly from the spray bar 16.

In the preferred embodiment, the spray bar 16 is suspended from above a conventional nipple-type poultry drinking line 24 by a pair of supporting cables 20 attached to a means 22 for raising and lower the spray bar 16. In the preferred embodiment, the means for raising and lowering the spray bar comprises an electric or mechanical winching system 22 and the spray bar 16 is lowered to approximately thirty inches above the drinking line 24 during the vaccination process.

In alternative embodiments, the spray bar 16 may be supported from the side or from below and the position of the spray bar 16 may be modified by any means known in the art. The position of the spray bar 16 relative to the drinking line 24 may also be modified. Further, the entire process may be automated so that a programmable controller 13 initiates multiple vaccination cycles of the same or different vaccines.

In operation, during a vaccination process, the spray bar 16 is lowered to a position adjacent a conventional poultry drinking line 24. The poultry are then deprived of water for a short time to increase the motivation of the poultry to congregate around the drinking line 24. When the flow of water is then restored, the vaccination solution is supplied to the spray bar 16 so that the spray bar nozzles 18 produce a vaccine solution mist. As the mist settles over the poultry, the poultry inhale the vaccinating solution mist, thereby vaccinates the poultry.

Vaccination System Testing Process

The initial phase of the vaccination system testing process was designated as Phase I. Phase I research set out to determine if a stationary vaccine application system was feasible in pilot-scale studies. Objectives for Phase I were: (1) determine required vaccination delivery time and (2) determine seroconversion rates of broiler chickens vaccinated for Newcastle disease (viral disease) with the automated spray system of the current invention. Objective 1 addressed baseline data requirements for the vaccine application system specifications and Objective 2 evaluated the use of the automated system in comparison to non-vaccinated control birds.

The pilot-scale prototype was constructed such that it can be transported for use in different research facilities with a minimum of disassembly. All control hardware and system elements (such as valves and pumps) were mounted to a cart and plumbed to the spray lines with flexible hose.

Vaccination Application Time Experiments

In order to properly design a spray system that would apply viable vaccine to a poultry flock, the duration of spray time was required. A study to determine application time was conducted in July 2007 and a total of three vaccination application trials were conducted, two with layer pullets and one with straight-run broiler chicks. The application time was modeled using a first order system response to a step increase and subsequent exponential decay (Equation 1).

$$y=y_0+a\cdot e^{t/\tau} \qquad \text{(Equation 1)}$$

where: y=normalized water consumption $y_0$=baseline water consumption a=regression constant t=time $\tau$=62% time constant.

The time constant, $\tau$, was determined using non-linear regression analysis; $\tau$ represents the initial slope of the decay and corresponds to the time required to reach 62% of the final value and $2\tau$ represents the 90% point. All raw data were normalized to non-dimensionalize the analysis and remove any inconsistencies that may occur from an increase in normal water consumption over the course of the experiment; data were transformed by dividing the measured flow rate by the maximum flow rate observed after water was returned to the birds.

Example data for water consumption patterns is shown in FIG. 2, along with a plot of the regression equation. The results show that the time to return to within 10% of normal water consumption after elevated water consumption due to prior water withdrawal from chickens before vaccine administration was approximately 18.6 minutes.

Intervet™ (manufacturer of the vaccine used in the spray application trials) technical services recommends vaccine be used within one hour of reconstitution. The inventor's measurements show that the duration of the drinking event is well within the time limits of vaccine effectiveness.

Figure 3:
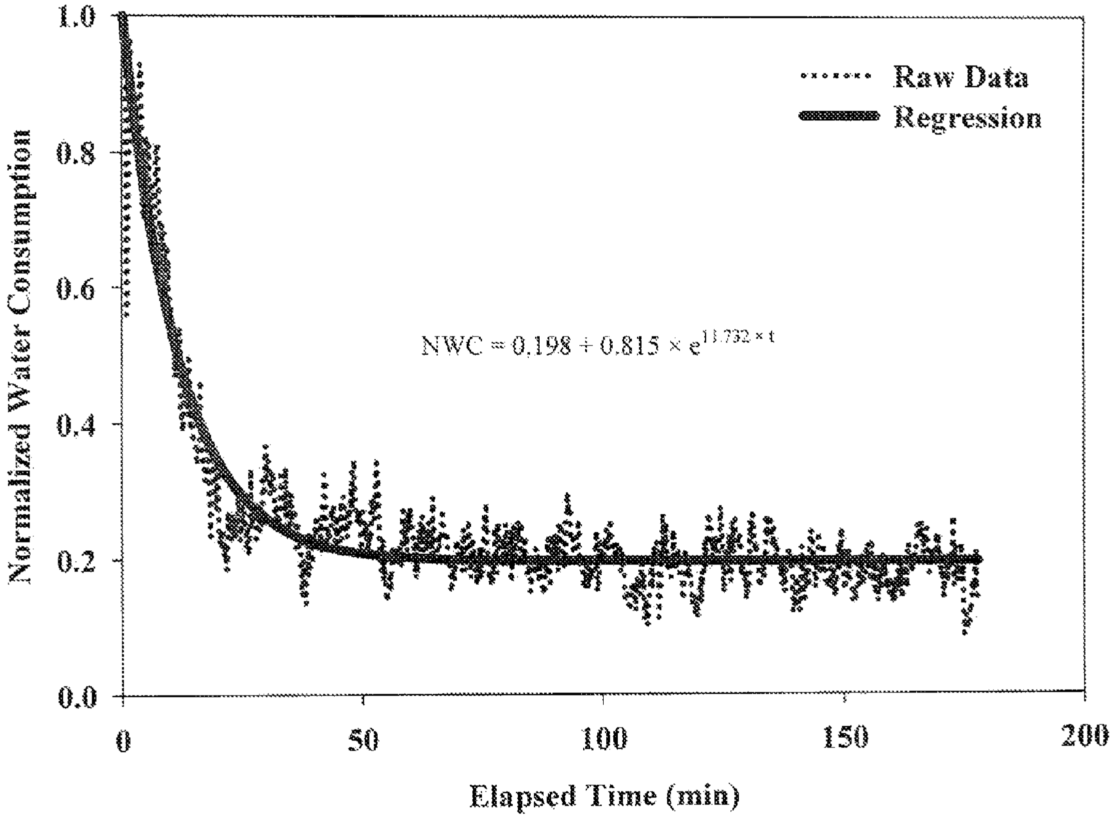
FIG. 3 shows normalized water consumption data after a water supply interruption associated with the invention testing process.

FIG. 3 shows normalized water consumption data associated with the inventor's measurements. Note the exponential decay of the data, which is indicative of a first order system response. Data associated with the regression equation is represented as the dashed line in FIG. 3.

Vaccination Application Experiments

Three vaccine application trials were conducted with both layer pullets and broilers. Consultation with poultry veterinarians indicated that Infectious Bronchitis would be better suited for initial experiments of this type, rather than Newcastle disease. The objectives of Phase I research were to determine if vaccine could successfully be applied by such a system, hence the change of vaccine was immaterial. For the vaccination trials, blood samples were collected from 30 birds in each of four treatment groups (2 vaccination groups, 2 control groups), and titers were obtained by ELISA methods. Geometric mean titers were statistically analyzed using an ANOVA to determine if differences existed between the treatment groups for all three trials. Statistical significance was considered at $P \leqq 0.05$.

Bronchitis vaccine was applied to one group of commercial layer pullets on Sep. 4, 2007, and blood samples were collected 21 days later on Sep. 25, 2007. Serology results verified exposure of the birds to the vaccine which was increased when compared to control birds, but titers were lower than typically observed in the field in commercial broiler chickens. A second application was performed on Oct. 11, 2007, and blood samples were collected on Nov. 5, 2007. Results from the second application again showed increased titers when compared to the control birds. Noise was noted as one aspect which required further attention to minimize.

The final live bird experiment was repeated with broiler chickens in November 2007. At 19 days of age, 500 broiler chickens were evenly distributed in the test pens. Vaccine was applied November 2 at 22 days of age after a two-hour withdrawal from drinking water. The birds did not approach the water line and stay under the spray as expected, most likely due to insufficient withdrawal time. One pen of birds was herded toward the water line to increase contact with the vaccine spray. Given the cool weather experienced during this test, it is likely that withdrawal time should be modified with weather conditions. However, for the group of birds encouraged to move underneath the vaccine spray, titers were increased when compared to the other group of exposed birds and control birds.

Figure 4:
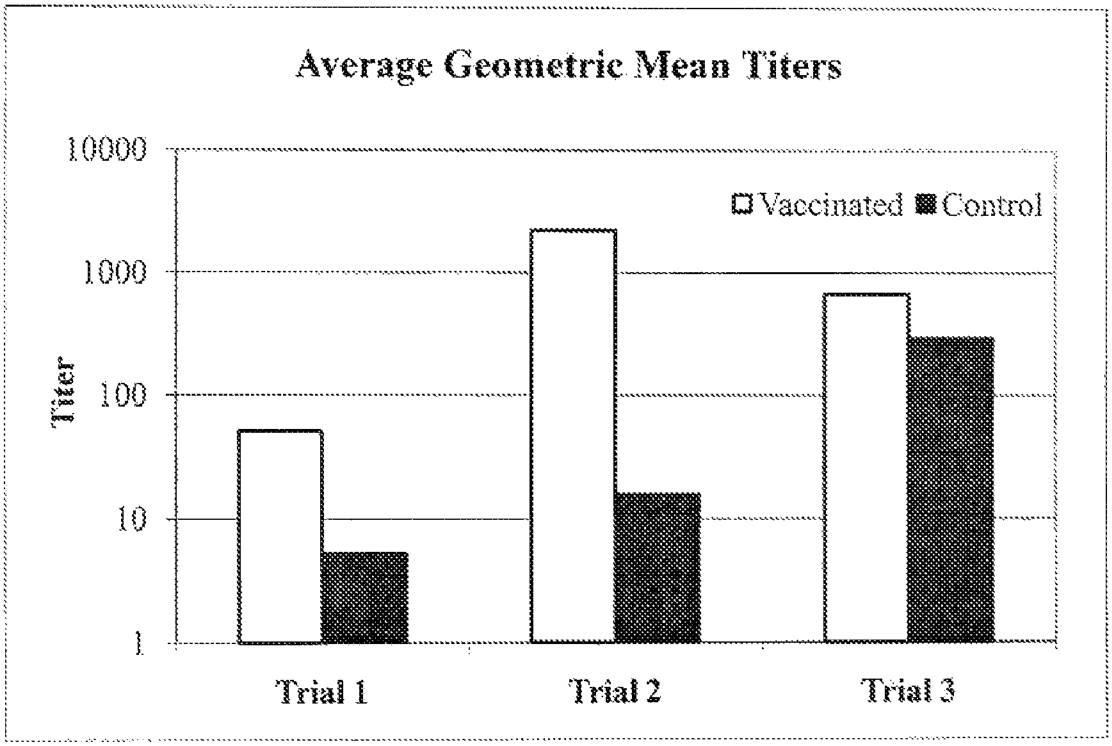
FIG. 4 shows the average geometric mean titers (GMT) for vaccinated and control birds for each experimental trial discussed infra.

FIG. 4 shows the average geometric mean titers (GMT) for vaccinated and control birds for each trial. In all trials the largest geometric mean titers were observed in birds vaccinated with the spray system and were significantly different ($P \leqq 0.02$). In all cases the GMT for vaccinated birds was increased over the control birds. In trials 1 and 3 there was variation within the spray vaccinated pens of birds. Two problems were identified which are probable causes of this variation, the first being noise; the pullet chicks are flighty by nature and the unfamiliar noise caused birds to crowd near the center of the pen. However, even with this variation the overall geometric mean titer was greater than that observed in control birds. The previous noted problem in the broiler chick trial (#3) regarding the lack of motivation to drink after two hours of water restriction was likely due to seasonal differences as this trial was conducted during late fall; however, when compared to the control group, geometric mean titers remained increased for the treatment group.

Trials conducted under Phase I research have shown that vaccine can be successfully spray applied from an automated, in-house system, and identified issues with the design which require refinement for commercial application. The optimum water withdrawal period under cool season conditions may be different than that originally determined during warm weather, and warrants further investigation, which is proposed for Phase II work to provide prescriptive recommendations for the operation of this system in the field. Noise can be reduced using a nozzle of different design which provides similar spray characteristics and alternative nozzle types will be investigated.

CONCLUSION

Phase I research resulted in positive proof-of-concept for the objectives set out in the Phase I proposal. Vaccines can be successfully applied with this method, but as with all experimental development projects, improvements in design and performance are necessary and further research and development are warranted. Our Phase I research identified critical design and application issues, resulting in more complete design and performance criteria. For example, a large reservoir for pre-mixing of the vaccine solution is impractical given the volume of water required to treat the entire flock for post drinking water withdrawal drinking event, thus in-line mixing equipment will be required.

For the foregoing reasons, it is clear that the invention provides an innovative system for vaccinating poultry. The invention may be modified in multiple ways and applied in various technological applications. For example, (although not an obvious modification of the current invention) the system may be used for swine, cattle, etc., or any other animal raised in groups and for which an airborne application of a vaccine or other inoculation is effective.

The current invention may be modified and customized as required by a specific operation or application, and the individual components may be modified and defined, as required, to achieve the desired result. For example, although the current invention uses the deprivation of drinking water as a motivation to entice the poultry to approach the vaccine spray line, other types of motivators or sustenance could also be used as a motivator. Examples include a water or non-water-based hydration means that is enhanced with salt or a sweetener, or the like. Although not an obvious modification of the current invention, different types of nourishment and foodstuffs should also be included as motivators that are within the scope of the current invention.

Although the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A poultry vaccination system comprising:

a sustenance supply means; and, an orally ingested vaccine spray means adjacent the sustenance supply means;

wherein the system is structured to control operation of the vaccine supply means in conjunction with the substance supply means so that when an operator temporarily withholds sustenance from the sustenance supply means, and then restores the sustenance, poultry partaking of the sustenance are vaccinated by the vaccine spray means.

2. The poultry vaccination system of claim 1 wherein the sustenance supply means comprises a drinking line, the sustenance comprising a hydration solution.

3. The vaccination system of claim 2 wherein the hydration solution comprises water.

4. The vaccination system of claim 1 wherein the vaccine spray means comprises spray nozzles.

5. The vaccination system of claim 4 wherein the spray nozzles create a spray mist that settles over the poultry.

6. The vaccination system of claim 4 wherein the nozzles are affixed to tubular spray bar.

7. The vaccination system of claim 6 wherein the spray bar is pressurized by pump.

8. The vaccination system of claim 6 wherein the spray bar is in communication with a vaccine mixing means.

9. The vaccination system of claim 8 wherein the vaccine mixing means mixes the vaccine into a vaccine solution.

10. The vaccination system of claim 9 wherein application of the vaccine is controlled by a controller.

11. The vaccination system of claim 6 wherein the spray bar is lowered over sustenance supply means before the sustenance is withheld.

12. The vaccination system of claim 6 wherein the spray bar is lowered over the sustenance supply means after the is withheld.

13. The vaccination system of claim 6 wherein the spray bar is raised and lowered by a winch system.

14. A method of orally vaccinating poultry, the method comprising the steps of:

providing a sustenance supply means;

positioning a vaccine spray means adjacent the sustenance supply means;

temporarily withholding sustenance so that poultry congregate around the sustenance supply means;

restoring a supply of sustenance through the sustenance supply means;

activating the vaccine spray means so that an orally ingested vaccine solution is sprayed in the area of the poultry.

15. The method of claim 14 wherein the sustenance comprises water.

16. The method of claim 15 wherein the vaccine spray means comprises a spray bar.

17. The method of claim 16 wherein the vaccine spray bar further comprises spray nozzles.

18. The method of claim 14 wherein prior to the activating step, the vaccine spray means is in communication with a vaccine mixing means.

19. The method of claim 14 wherein in the activating step, the poultry inhale the sprayed vaccine solution so that the poultry are successfully vaccinated.

* * * * *